Aug. 20, 1929.  J. SLEPIAN  1,725,164

RELAY SYSTEM FOR SUPERVISORY CONTROL

Filed March 17, 1924

WITNESSES:

INVENTOR
Joseph Slepian
BY
Wesley G. Carr
ATTORNEY

Patented Aug. 20, 1929.

1,725,164

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

RELAY SYSTEM FOR SUPERVISORY CONTROL.

Application filed March 17, 1924. Serial No. 699,654.

My invention relates to signalling systems and particularly to a relay system for supervisory control.

One object of my invention is to provide a signalling system for an alternating-current circuit that shall respond to currents of high frequency that are superimposed on the alternating-current circuit.

Another object of my invention is to provide a signalling system for use in connection with alternating-current circuits that shall include a polarized relay responsive to currents of high frequency superimposed on the alternating-current circuit.

Another object of my invention is to provide a signalling system for use with alternating-current circuits that shall be provided with a detector having unilateral conductivity when subjected to currents of high frequency.

In my copending application, Serial No. 668,554, filed October 15, 1923, and which is assigned to the Westinghouse Electric & Manufacturing Company, I have shown and described the characteristics of a resistance material having non-linear conductivity. The resistance material is composed of a mixture of powdered carborundum, amorphous carbon and a bonding agent, such as kaolin or water glass. The effective resistance of this material changes in accordance with changes in the voltage applied thereto.

Figure 1:
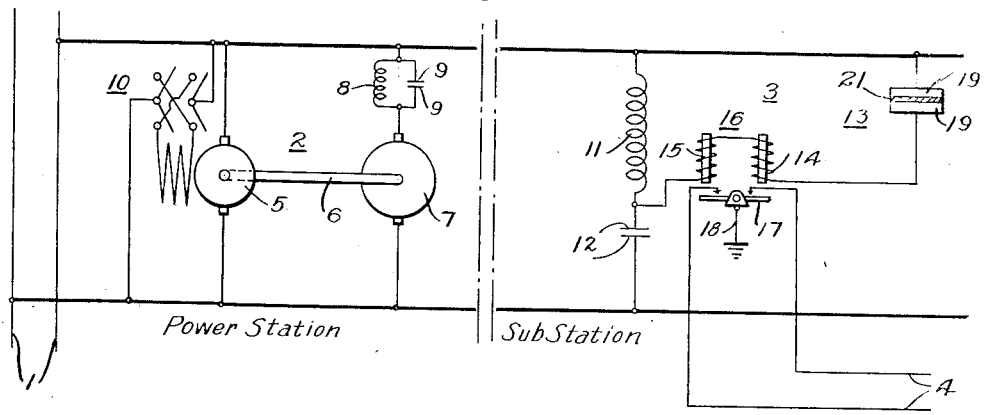
Figure 2:
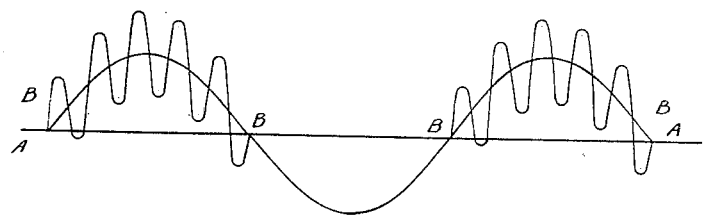
Figure 3:
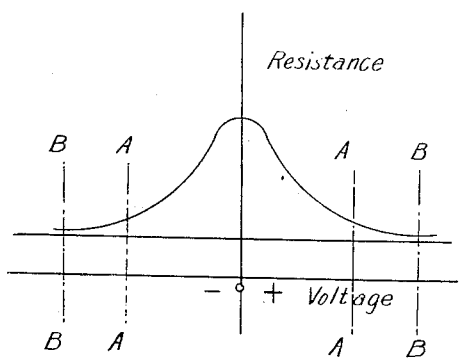

In the accompanying drawings,

Figure 1 is a diagrammatic view of circuits and apparatus embodying my invention, Fig. 2 is a curve illustrating the relation between the normal wave formation of an alternating-current circuit and an imposed current of a higher frequency, and Fig. 3 is a curve showing the resistance characteristic of my improved material when subjected to an electrical potential.

My invention comprises, in general, an alternating current system of distribution 1, a motor generator set 2 energized therefrom, supplying a current of a higher frequency thereto, and a relay system 3 controlled by the current of higher frequency traversing the alternating-current system 1 for controlling the circuit 4 communicating with suitable signalling or supervisory control apparatus (not shown).

The distributing system 1 is energized from any suitable source of electromotive force (not shown), and comprises a series of main and subsidiary circuits in a manner well known to the art. In order to signal from one portion of this system, such as a power station, to a remote portion, such a substation, it has been found feasible to superimpose a feeble current of high frequency on the distribution system rather than to extend pilot wires from one station to the other. This is accomplished by making use of a motor generator set 2.

The motor generator set 2 comprises a motor 5 that operates in synchronism with the frequency of the current in the distributing system 1 which is generally at 60 cycles. The motor 5 is mechanically connected by a shaft 6 to a generator 7 that is wound so as to generate a current of much higher frequency than the power currents traversing the system 1 during alternate half cycles of the power current. A convenient ratio between the frequency of the motor 5 and the generator 7 is 1 to 10, whereby the generator 7 impresses a frequency of 600 cycles upon the system 1. The generator 7 is connected through a reactor 8 and a capacitance 9 in parallel connection to the system. A reversing switch 10 may be placed in the field circuit of the motor 5. The reactor 8 and the capacitance 9 are suitably selected so that the circuit of the generator 7 is resonant to the normal frequency of the transmission system 1 in order to prevent the 60-cycle current from traversing the generator.

The relay system 3 at the far end of the system 1 comprises a reactor 11 and a capacitance 12 in series connection across a phase of the distributing system 1 so proportioned that their circuit is resonant to the power currents of 60 cycles impressed upon the system 1. In parallel circuit with the reactor 11, and in series relation with each other, there is connected a resistor 13 composed of a composition hereinafter described and coils 14 and 15 of a polarized relay 16. The polarized relay 16 comprises a pivoted armature member 17 that is adapted to selectively connect either of the conductors of the circuit 4 to a grounded conductor 18, whereby suitable signalling devices or supervisory control devices (not shown) are operated.

The resistor 13 comprises a pair of conducting plates 19 between which is placed a uniform layer 21 of a material composed of powdered carborundum, amorphous carbon and a bonding agent, such as kaolin or water glass. As is shown in Fig. 3, this material has a higher resistance when subjected to low voltages than when subjected to high voltages.

Referring to Fig. 2, the voltage of the power currents in the system 1 follows the well known sinusoidal curve A—A having a maximum voltage that may be represented diagrammatically by the lines A—A in Fig. 3. The characteristic curve B—B, Fig. 2, of the current impressed upon the system 1 by the generator 7 also follows the well known sinusoidal curve, but the axis of the curve B—B is the sinusoidal curve A—A. The maximum voltage impressed across the relay system is therefore the algebraic sum of the two wave formations and this sum is materially higher than that of the simple power wave A and its frequency is as has been described, approximately ten times that of the power wave A—A.

Referring to Fig. 3, it will be seen that the voltage of that half cycle which has the superimposed wave B—B thereby intercepts a segment of the characteristic curve of the resistor 13 in such manner that mean resistance offered to the passage of current by the resistor 13 is less. Accordingly, more current passes through the relay 16 during those half cycles which have the superimposed high frequency currents than during those half cycles which do not have the superimposed high frequency currents. Thus the net effect is to produce a continuous current through the relay, having the direction corresponding to the half cycles with the superimposed high frequency currents. In the event that it is desired to transmit signals in the reverse direction from the direction heretofore described, it is obvious that causing the motor 5 to slip a pole by reversing the field current by means of switch 10 will cause the polarized relay 16 to operate in the reverse direction.

It will thus be seen that I have provided a signalling system for alternating-current distributing systems that is characterized by the utilization of a material having non-linear conductivity for the purpose of transmitting signals from different points in the same system. This relay system may also be utilized for controlling apparatus connected directly to the distributing system such as motors and the like. Also a plurality of motor generator sets, each having a particular frequency may be connected to the same distributing system for controlling a plurality of remotely located machines or relays.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, a transmission system having an alternating voltage of normal frequency impressed thereon, means for impressing a voltage of a frequency higher than that of the first-mentioned voltage on one set of alternate half-cycles of the latter, whereby the maximum value of the system voltage is greater during those alternate half-cycles than during the remaining half-cycles, and a circuit-controlling relay having its winding connected to the system in series with an element the conductivity of which varies in proportion to the voltage impressed thereon, for controlling the current through said winding in accordance with the maximum value of the system voltage during alternate half-cycles.

2. In a system of control, a transmission system having a voltage of normal frequency impressed thereon, means for impressing upon one set of alternate half-cycles thereof, a voltage of a higher frequency, to increase the maximum value of the system voltage during said half-cycles, and a relay having its winding connected to the system in series with an element composed of carborundum and carbon, the conductivity of which is a function of the voltage impressed thereon, for controlling the current through said winding in accordance with the maximum value of the said alternate half-cycles.

3. In a system of control, a transmission system having a voltage of normal frequency impressed thereon, means for impressing a voltage wave of higher frequency on the same system, a relay having its winding connected to the transmission system for controlling a secondary circuit, and means having a conductivity varying in proportion to voltage changes in series with the relay for controlling the current transmitted to the relay.

4. In a system of control, a transmission system having a voltage of normal frequency impressed thereon, means for impressing upon either set of alternate half-cycles of said system voltage a high-frequency control voltage to increase the maximum value of the system voltage during said half-cycles, a polarized relay connected to the system in series with an element the resistance of which varies with voltage, and means for selecting the set of alternate half-cycles of the system voltage upon which the high-frequency voltage is to be impressed.

5. In a system of control, a transmission system having a voltage of normal frequency impressed thereon, means for selectively impressing a voltage wave of a frequency higher than that of the first-mentioned voltage, upon either set of alternate half-cycles of the latter to give one set of alternate half-cycles a greater maximum value than the other, and a polarized relay having its winding connected to the system in series with an element composed of carborundum and carbon for controlling the excitation of the said winding by the voltage of the alternate half-cycles having the higher maximum value.

In testimony whereof, I have hereunto subscribed my name this 29th day of February, 1924.

JOSEPH SLEPIAN.